(12) United States Patent
Ineichen et al.

(10) Patent No.: US 8,160,120 B2
(45) Date of Patent: Apr. 17, 2012

(54) METHOD FOR TRANSMITTING DATA BETWEEN A CONTROL UNIT AND A PLURALITY OF REMOTE I/O UNITS OF AN AUTOMATED INSTALLATION

(75) Inventors: Alois Ineichen, Ruswil (CH); Thorsten Godau, Suessen (DE); Daniel Bakovic, Esslingen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 99 days.

(21) Appl. No.: 12/788,616

(22) Filed: May 27, 2010

(65) Prior Publication Data

US 2011/0045857 A1    Feb. 24, 2011

Related U.S. Application Data

(63) Continuation of application No. PCT/EP2008/009842, filed on Nov. 20, 2008.

(30) Foreign Application Priority Data

Nov. 27, 2007 (DE) .......................... 10 2007 058 267

(51) Int. Cl.
*H04B 1/00* (2006.01)
(52) U.S. Cl. ........ 375/132; 375/133; 375/134; 375/135; 375/136; 375/137
(58) Field of Classification Search .................. 375/132, 375/133, 134, 135, 136, 137
See application file for complete search history.

(56) References Cited

U.S. PATENT DOCUMENTS

| 2004/0240526 | A1 | 12/2004 | Schmandt et al. |
| 2006/0221902 | A1 | 10/2006 | Chen et al. |
| 2006/0269028 | A1 | 11/2006 | Bley et al. |

FOREIGN PATENT DOCUMENTS

| DE | 103 14 553 A1 | 10/2004 |
| EP | 1 705 620 A1 | 9/2006 |

OTHER PUBLICATIONS

Phoenix Contact, Interface Wireless, 8 pages.
European Committee for Standardization, EN 954-1, Safety-related parts of control systems, Dec. 1996, 33 pages.
European Committee for Standardization, EN ISO 13849-1, Safety of machinery—Safety-related parts of control systems—Part 1: General principles for design, Nov. 2006, 96 pages.

*Primary Examiner* — Siu Lee
(74) *Attorney, Agent, or Firm* — Harness, Dickey & Pierce, P.L.C.

(57) ABSTRACT

A control unit sends a plurality of request messages to the I/O units. The I/O units send a plurality of response messages to the control unit. The request messages and response messages are sent using radio-frequency signals. The I/O units expect to receive a request message within defined first time intervals, and the control unit expects to receive at least one response message within defined second time intervals. The control unit and the I/O units maintain a selected transmission frequency for as long as the request messages and response messages are received within the defined time intervals. The control unit and the I/O units change the transmission frequencies according to a defined pattern if no expected message is received within the defined time intervals.

13 Claims, 2 Drawing Sheets

METHOD FOR TRANSMITTING DATA BETWEEN A CONTROL UNIT AND A PLURALITY OF REMOTE I/O UNITS OF AN AUTOMATED INSTALLATION

CROSS REFERENCES TO RELATED APPLICATIONS

This application is a continuation of international patent application PCT/EP2008/009842 filed on Nov. 20, 2008 designating the U.S., which international patent application has been published in German language and claims priority from German patent application DE 10 2007 058 267.8 filed on Nov. 27, 2007. The entire contents of these prior applications are incorporated herein by reference.

BACKGROUND OF THE INVENTION

The present invention relates to a method for transmitting data between a control unit and a plurality of remote I/O units in an automated installation, and to a corresponding installation comprising a control unit and a plurality of remote I/O units.

For many years, there have been efforts to automate the process cycles during the industrial manufacture of products more and more. This results in increasing networking of devices and components which are involved in the production processes. Typically, these are sensors for detecting installation or process states, actuators which effect a change in the installation or process states, and control units for producing control signals which are used to actuate the actuators as a function of the sensor signals. In small installations, the sensors and actuators may be connected directly to the control unit. In larger and extensive installations which require a large number of sensors and actuators, there is frequent use of remote I/O units (input/output) to which the sensors and actuators are connected. The I/O units communicate with the control unit via communication networks which meet the specific requirements for such applications, in particular in respect to the harsh ambient conditions and the specific requirements for a communication between control units and remote sensors and actuators. An example of such communication networks is field buses, such as what is known as the Profibus, the Interbus and the CAN bus. Usually, these field buses use electrical and/or optical lines for networking the connected units.

Furthermore, for some years there have been efforts to implement the networking of devices in automation technology on the basis of the known Ethernet standard, which has become typical for the networking of personal computers in home and office applications. In this connection, there are also efforts to establish the connection between the units wirelessly, which is already often the case in home and office networks using WLAN. By way of example, a brochure from the German company Phoenix Contact GmbH & Co. KG, the Head Office of which is in 32823 Blomberg, Germany, entitled "INTERFACE Wireless—Unidirektionale drahtlose Datentibertragung" [INTERFACE Wireless—Unidirectional wireless data transmission] discloses a WLAN communication device for wireless networking of devices in the field of automation technology.

However, the technology of home and office networks cannot readily be transferred to applications in industrial production environments, because the need for communication and the ambient conditions are different. For example, factory buildings frequently contain a large number of metal articles and moving objects which can greatly influence the propagation of radio waves. Moreover, the communication between the control units and the sensors and actuators frequently needs to take place in defined, cyclically recurring time intervals in order to allow a continuous and trouble-free production process. This cyclic data traffic is made more difficult if the radio link is disturbed by other radio services, particularly by other WLAN and Bluetooth radio networks in local proximity.

To allow reliable data traffic between a control unit and remote I/O units even in a noisy environment, it is known practice to change the transmission frequencies at which the data messages are transmitted between the units at regular intervals. The brochure from the Phoenix company discloses such a method, which is called Frequency Hopping Spread Spectrum (FHSS). On the basis of this method, the transmitters and receivers change the transmission frequency on the basis of a defined pattern which is stored in all the units involved in the form of a frequency hopping table. The Phoenix devices change the transmission frequencies continually every 27 ms. If a data message is sent on a noisy transmission frequency, this data message is lost. However, the subsequent transmission on the next transmission frequency allows successful data transmission with a high level of probability.

It is furthermore known, in principle, to match a frequency hopping table adaptively to ambient conditions by omitting noisy transmission frequencies for some time (Adaptive FHSS=AFHSS).

In all the known FHSS methods, the communication subscribers are continually hopping from one transmission frequency to the other. This has the drawback that the communication networks themselves occupy a large portion of the available, limited frequency band and can therefore disturb other radio networks.

SUMMARY OF THE INVENTION

Against this background, it is an object of the present invention to provide a method and an apparatus of the type mentioned at the outset, wherein the available frequency band is used efficiently and with as little interference as possible for adjacent radio networks. In addition, the novel method and the devices should allow easy and inexpensive implementation.

According to one aspect of the invention, there is provided a method for transmitting data between a control unit and a plurality of remote I/O units in an automated installation, the method comprising steps: transmitting a plurality of request messages from the control unit to the I/O units, and transmitting a plurality of response messages from the I/O units to the control unit, wherein the request messages and the response messages are transmitted using radio-frequency signals, wherein the I/O units expect to receive a request message within defined first time intervals, and the control unit expects to receive at least one response message within defined second time intervals, wherein the control unit and the I/O units maintain a selected transmission frequency for as long as the request messages and response messages are received within the defined time intervals, and wherein the control unit and the I/O units change the transmission frequencies on the basis of a defined pattern if no expected message is received within the defined time intervals.

According to another aspect, there is provided an automatically operating installation, comprising a control unit and a plurality of remote I/O units, wherein the control unit wirelessly communicates with the I/O units using transmission frequencies in order to read in state data for the installation from the I/O units and in order to output control commands to the I/O units, wherein the control unit is designed to transmit a plurality of request messages to the I/O units and to receive a plurality of response messages from the I/O units, wherein the I/O units are designed to receive the request messages and, on the basis thereof, to transmit the response messages, wherein the I/O units expect to receive a request message within defined first time intervals, and the control unit expects to receive at least one response message within defined second time intervals, wherein the control unit and the I/O units each maintain a selected transmission frequency for as long as the request messages and the response messages are received within the defined time intervals, and wherein the control unit and the I/O units each change the transmission frequency in accordance with a defined pattern if no expected message is received within the defined time intervals.

There is also provided a control unit for controlling automatically operating installation comprising a plurality of remote I/O units, the control comprising a transceiver for transmitting request messages to the I/O units and for receiving response messages from the I/O units using a transmission frequency, wherein the transceiver is designed to expect a response message within a predefined time interval, further comprising a memory for storing a defined frequency hopping table, wherein the transceiver is further designed to change a transmission frequency in accordance with the defined frequency hopping table if and only if no response message is received within the defined time interval.

Finally, the is also provided an I/O unit for an automatically operating installation automatically operating installation comprising a control unit and a plurality of I/O units, the I/O unit comprising a transceiver for receiving request messages from the control unit and for transmitting response messages to the control unit using a transmission frequency, wherein the transceiver is designed to expect a request message within a predefined time interval, further comprising a memory for storing a defined frequency hopping table, wherein the transceiver is further designed to change a transmission frequency in accordance with the defined frequency hopping table if and only if no request message is received within the defined time interval.

The method and the new devices exploiting the method thus use a frequency hopping approach, on the basis of which transmission frequencies for the data communication are changed in accordance with a previously defined pattern. In contrast to the known FHSS methods, however, the defined frequency hops are performed only if the data communication on the selected transmission frequency fails. As long as the control unit and the I/O units can receive the data messages sent to them within the defined time intervals at least to the extent that decoding of the information is possible, the currently selected transmission frequencies are maintained. As a result, the novel method uses only one or a few transmission frequencies when data communication is successful, and the total available frequency band can be used by other radio networks without interference. The novel method is therefore very "economical" in its handling of the limited "frequency" resource. On the other hand, the novel method uses the advantageous properties of FHSS if a successful data communication between the control unit and the remote I/O units is not possible at a currently selected frequency.

The method makes use of the fact that data communication for the control of automated installations typically takes place at regular time intervals. This distinguishes the data communication in an automated installation from other communication applications in the home and office areas. Furthermore, the volumes of data to be transmitted for the communication in automated installations is usually relatively small. The data communication in an automatically operating installation is therefore easy to predict and complies with a behavior that is at least largely known in advance.

The method makes use of this known behavior by initiating a change of transmission frequencies on the basis of the defined pattern as a result of the absence of an expected data message which ought to arrive within the defined time interval. The absence of an expected data message thus signals to the waiting control unit or I/O unit that a frequency change on the basis of the previously stipulated pattern is appropriate and needs to be started.

This frequency change is not permanently maintained on the basis of the novel method, however, but rather is stopped again on the basis of previously stipulated criteria, so that after a number of frequency changes a transmission frequency is maintained for a relatively long period again. A preferred method for ending the frequency hops is described further below with reference to preferred refinements and exemplary embodiments.

On the other hand, the method does not merely perform a single test on a new frequency but rather applies the FHSS method for the period of disturbed data communication. Hence, the novel method combines the advantages of FHSS with the advantages of a fixed frequency method. To make the change from FHSS to the use of a fixed frequency simple and efficient, the novel method makes use of the fact that the absence of an expected data message is also information which can easily be "transmitted" to all the communication subscribers. As a result, the novel method can be implemented quite easily and inexpensively. Moreover, the novel method uses the available frequency band very efficiently and in a very conservative, cooperative manner.

In a preferred refinement, the control unit and the I/O units change the transmission frequencies on the basis of the defined pattern only if no expected message is received within the defined time intervals.

In this refinement, frequency changes on the basis of the defined pattern are used to sidestep to another transmission frequency only if successful data communication is not possible on the previously used transmission frequency. Alternatively, frequency hops on the basis of the defined pattern could, in principle, also be triggered in another way, for example using a suitable control command which is transmitted from the control unit or from a user to all the remote I/O units. The preferred refinement uses the available frequency band in a very efficient and cooperative manner.

In a further refinement, the control unit and the I/O units change the transmission frequencies on the basis of the defined pattern only if no expected message is received within a plurality of defined time intervals.

In this refinement, the control unit and the I/O units each have an error counter which is used to count the number of failed data messages in successive time intervals. The frequency hopping method is only initiated, if successful data transmission is not possible within a plurality of successive time intervals. In other words, a defined number of message failures are tolerated without initiating the frequency hopping method. This refinement uses the available frequency band even more efficiently and cooperatively, because individual lost data messages still do not result in the control unit and the I/O units occupying previously unused portions of the frequency band.

In a further refinement, the control unit sends the request messages to the I/O units in a defined sequence, wherein the control unit stops sending the request messages for a defined period if an expected response message is absent. Preferably, the control unit sends a request message to precisely one I/O unit in each case, so that there is only ever one I/O unit communicating with the control unit within the cyclically recurring data communication. Furthermore, it is preferred if the defined sequence with which the control unit transmits request messages to the I/O units is constant, i.e. the control unit always transmits the request messages to the plurality of I/O units in the same order.

In these refinements, the control unit consciously interrupts the data communication with the I/O units in order to initiate the frequency hopping method in all the I/O units involved. This refinement is a very simple and inexpensive way of prompting all the I/O units in the system to use the defined pattern to change to a new transmission frequency which is then used by all the units.

In a further refinement, the defined period is at least equal to the length of the second time interval multiplied by the number of I/O units in the defined sequence minus 1. Preferably, the defined period is approximately equal to the length of the second time interval multiplied by the number of I/O units in the defined sequence minus 1.

In this refinement, the control unit interrupts the data communication with the I/O units for so long that all I/O units, which are interrogated by the control unit in the defined sequence, start the frequency hopping process. This refinement ensures that all the units involved in the data communication change to new transmission frequencies on the basis of the defined pattern. The behavior of the individual I/O units can be synchronized very easily in this way. Moreover, the duration of the frequency search is minimized if the defined period is short.

In a further refinement, the control unit transmits a frequency change stop command to the I/O units if it (the control unit) has received a response message from all the addressed I/O units within the defined second time intervals. Preferably, the control unit sends the frequency change stop command as part of the request messages sent cyclically to the I/O units.

These refinements are a very simple way of allowing the remote I/O units to end the frequency hops on the basis of the defined pattern as soon as the data transmission between the control unit and the I/O units is working again in a trouble-free manner. In this way, the control unit can "collect" all the "hopping" I/O units again. This refinement is particularly advantageous in combination with the preceding refinements, according to which the control unit consciously suppresses request messages in order to prompt the I/O units to make the frequency hops, because the control unit can in this way influence the behavior of all the I/O units involved. The control unit can thus very easily ensure that all the I/O units involved change to the frequency hopping process, and it can end the frequency hopping process again for all the I/O units involved. As a result, the control unit can very easily coordinate the change to a new transmission frequency which has less interference or no interference.

In a further refinement, the control unit transmits a request message at a current transmission frequency only if the current transmission frequency is free.

In this refinement, the control unit checks, prior to sending the request message, whether the currently selected transmission frequency is occupied or disturbed by adjacent transmitters. Preferably, the control unit thus uses its receiver not only to receive response messages from the I/O units but also to check whether the currently selected transmission frequency is available. Such a check on the availability of a radio channel is known in Ethernet networks as "Carrier Sense". In contrast to the Ethernet networks, however, the control unit in this case checks the availability of the radio channel in terms of interference by other radio networks, not in terms of occupation by other subscribers in its own radio network. In preferred exemplary embodiments, the control unit allows the scheduled request message to fail if the result of the check is that the currently selected transmission frequency is noisy. In this way, the I/O unit that should be addressed by means of the failed request message is informed that the transmission frequency is noisy. The waiting I/O unit then starts the frequency hopping process depending on the status of its error counter (if available), or it waits for the next communication cycle having a first time interval in which it should receive a further request message.

These refinements contribute to even more efficient and cooperative use of the frequency band, because the control unit sends request messages only if there is a reasonable expectation for a successful data communication. Unnecessary "pollution" of the environment by unsuccessfully transmitted request messages is avoided.

In a further refinement, transmission frequencies at which response messages are repeatedly absent are removed from the defined pattern. Said transmission frequencies can be permanently deleted or can be masked out of the defined pattern only for a previously defined period of time. Preferably, the control unit uses the request messages to inform the I/O units that a particular transmission frequency is intended to be removed from the defined pattern. The control unit and I/O units can then delete or mask out the relevant transmission frequency from the respectively stored frequency hopping table.

This refinement uses an adaptive frequency hopping method, which is know per se, in combination with the new method, according to which frequency changes are performed only when required. By virtue of the control unit removing transmission frequencies at which response messages are repeatedly absent from the defined pattern, the available frequency band is used even more efficiently and cooperatively.

In a further refinement, the pattern defines a sequence of different transmission frequencies from a group of transmission frequencies, wherein the transmission frequencies are arranged in the sequence with maximum relative frequency differences.

The result of this refinement is that the control unit and the I/O units can usually end their common search for a new transmission frequency more quickly. If the frequency hopping process is initiated on account of the noisy data communication, the control unit and the I/O units hop to frequencies which are as far away as possible from the previously selected, noisy transmission frequency. Interference signals which impair a plurality of adjacent channels can therefore be bypassed more quickly.

It goes without saying that the above features and those which are yet to be explained below can be used not only in the respectively indicated combination but also in other combinations or on their own without departing from the scope of the present invention.

BRIEF DESCRIPTION OF THE DRAWINGS

Exemplary embodiments of the invention are shown in the drawing and are explained in more detail in the description below. In the drawing.

DESCRIPTION OF PREFERRED EMBODIMENTS

Figure 1:
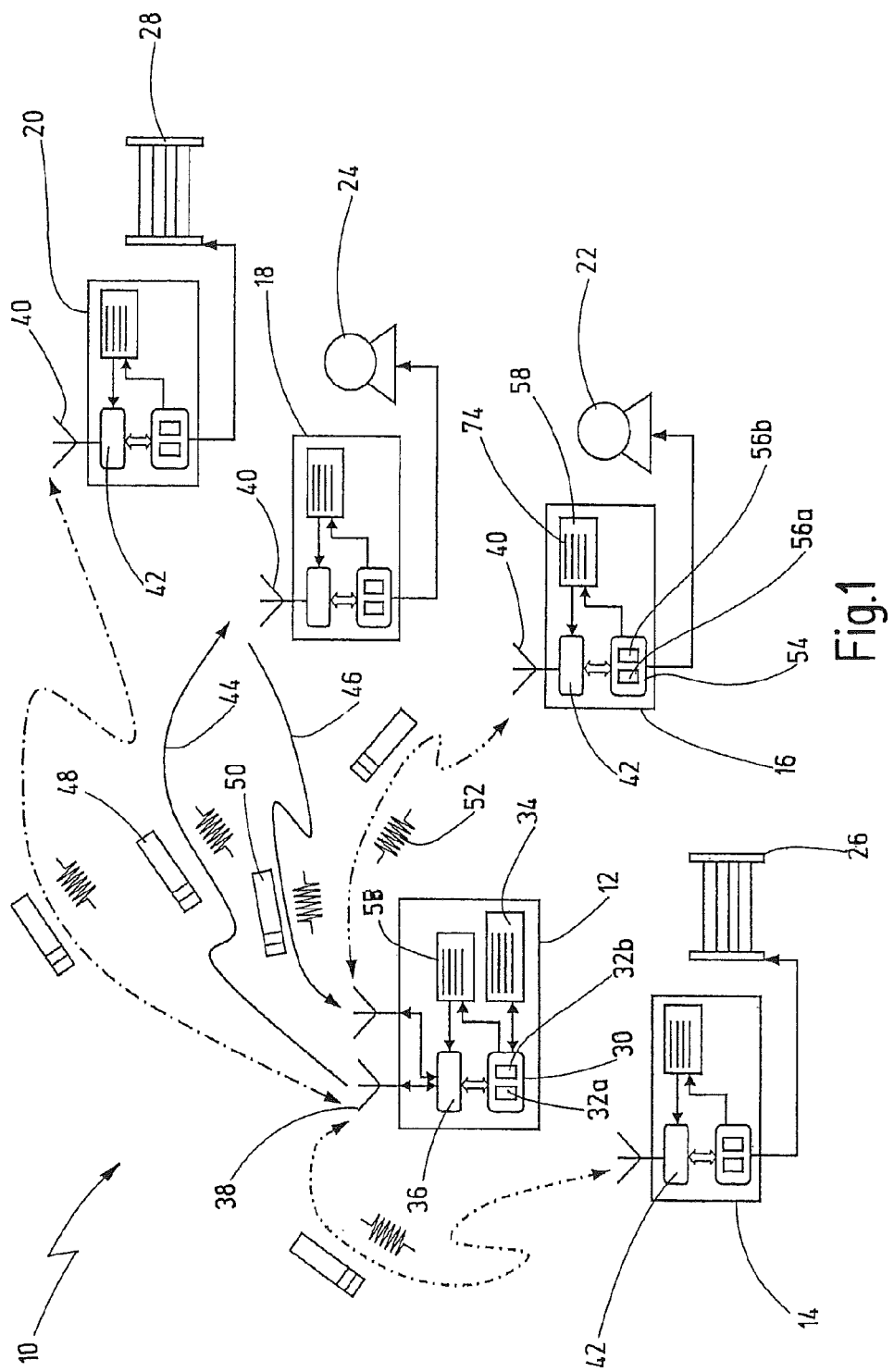
FIG. 1 shows a schematic illustration of an automated installation based on an exemplary embodiment of the invention.

In FIG. 1, an installation according to an exemplary embodiment of the invention is denoted as a whole by reference number 10.

The installation 10 has a control unit 12 and a plurality of remote I/O (input/output) units 14, 16, 18, 20. The I/O units 16 and 18 each have a respective electrical drive 22, 24 connected to them. By way of example, these are drives for a robot or for another machine for automatically machining workpieces (not shown here). The drives 22, 24 are supplied with power via the I/O units 16, 18 and can therefore be shut down by the I/O units 16, 18. The I/O units 14 and 20 each have a respective light barrier 26, 28 connected to them. The light barriers 26, 28 are used to safeguard the robot and/or the electrical machine against dangerous external actions. The light barriers 26, 28 are typical examples of sensors, the signal states of which are read in by the control unit 12 in order to take them as a basis for producing control signals which can be used to shut down the drives 22, 24.

The control unit 12 and the I/O units 14, 16, 18, 20 in this case together form a safety-related control system pursuant to the standards EN 954-1, IEC 61508 and/or EN ISO 13849-1. In preferred exemplary embodiments, the control unit 12 and the I/O units 14, 16, 18, 20 each are in failsafe form in terms of category 3 or higher of EN 954-1 and/or in accordance with SIL 3. To achieve this, the safety-related parts of the control unit 12 and of the I/O units 14, 16, 18, 20 are of redundant design, and they perform regular function tests in order to ensure that the drives 22, 24 may be shut down even when a failure occurs. In preferred exemplary embodiments, the control unit 12 also comprises the operational control for the drives 22, 24, i.e. the control of the normal operational movements of the robot or of the machine. In principle, however, the control unit 12 could also be a pure operational controller, and the safety-related control functions could be controlled by a further control unit (not shown here) which is installed in the control cabinet of the robot or of the machine, for example.

Furthermore, it is possible for the control unit 12 to be a remote unit in relation to a superordinate control unit (not shown). In one exemplary embodiment, the control unit 12 is an I/O unit which, to a certain extent, acts as a relay station for the further I/O units 14 to 20. In this case, however, the control unit 12 controls at least the communication with the other I/O units 14 to 20.

In the exemplary embodiment shown, the control unit 12 has a signal and data processing part 30 which is of redundant design. The signal and data processing part 30 has two processors 32a, 32b which operate redundantly in respect of one another and monitor one another. The processors 32a, 32b can access one or more memories 34 which, in this case, store the control program for the installation 10.

In addition, the control unit 12 has a communication interface 36, which in this case is connected to two microwave antennas 38a, 38b. In one preferred exemplary embodiment, the two antennas are integrated to form an integrated diversity antenna, which is described in a parallel patent application from the applicant entitled "Microwave antenna for wirelessly networking devices of automation technology". However, the antenna 38 could also be a simple rod antenna or a suitable directional antenna. The signal and data processing part 30 communicates with the remote I/O units 14, 16, 18, 20 via the communication interface 36 and the antenna 38 in order to read in the signal states of the sensors 26, 28 and to output the control commands for the drives 22, 24.

Each I/O unit 14, 16, 18, 20 has an antenna 40 and a communication interface 42. The I/O units 14, 16, 18, 20 communicate with the control unit 12 via the antenna 40 and the communication interface 42 in order to transmit the sensor signals and to receive the control commands. For this purpose, the communication interfaces 36, 42 transmit and receive radio signals 44, 46 in the radio-frequency range. In one exemplary embodiment, the frequency of the radio signals 44, 46 is in the region of 2.4 GHz. Each radio signal comprises a plurality of chronologically successive signal packets (what are known as bursts), between which there are break times. The radio-frequency signal packets are used to transmit messages in which the data, which are interchanged between the control unit 12 and the I/O units 14, 16, 18, 20, are coded.

In particular, the control unit 12 sends a request message 48 to each I/O unit 14, 16, 18, 20 at regular, predefined intervals. In principle, the request messages 48 could be broadcast messages which the control unit 12 sends to all the I/O units 14, 16, 18, 20 simultaneously. In preferred exemplary embodiments, however, the control unit 12 sends a request message 48 to a selected I/O unit. The addressed I/O unit (in this case the I/O unit 18, for example) has its address placed in the request message 48. For this purpose, the request message 48 has a message header which contains the address. Furthermore, the message contains a data protection part, for example in the form of a CRC checksum.

The control unit 12 expects a response message 50 from the addressed I/O unit 18 within a defined (second) time interval after the request message is sent. When the defined second time interval has elapsed, the control unit 12 sends the next request message 48 to the next I/O unit in the defined sequence of the I/O units. Each I/O unit expects a request message 48 within defined (first) time intervals, which are obtained from the duration of the second time intervals and the number of I/O units. In the preferred exemplary embodiment, the I/O units 14, 16, 18, 20 are thus called by the control unit 12 in sequence, and they each respond with a response message 50. The response messages 50 are used firstly as a confirmation signaling to the control unit 12 that the addressed I/O unit has received the request message 48. Secondly, the I/O units 14, 16, 18, 20 send their transmission data to the control unit 12 using the response messages 50.

It is also possible for the control unit 12 to send different kinds of request messages 48 to the I/O units 14, 16, 18, 20, and, accordingly, there may be different kinds of response messages 50. For the implementation of the novel method, however, differences between the various messages are insignificant, which is why a distinction is drawn here only between request messages 48 from the control unit 12 and response messages 50 from the I/O units.

Each message is transmitted using the radio signals 44, 46. The radio signals 44, 46 use a transmission frequency 52 which is modulated in a known manner in order to code the message data. In this case, the transmission frequencies 52 are changed only if the radio signals 44, 46 are so noisy that the messages 48, 50 are no longer able to be received and decoded by the respective addressee.

As shown by means of the I/O unit 16, the I/O units in this case each have a data and signal processing part 54, which is likewise shown with two redundant processors 56a, 56b. In this exemplary embodiment, the I/O units 14, 16, 18, 20 are failsafe in terms of category 3 or higher of EN 954-1, in terms of SIL 3 or comparable safety requirements. For non-safetyrelated applications, the I/O units 14, 16, 18, 20 could be of single-channel design. Furthermore, instead of microprocessors, other signal and data processing circuits can be used, such as FPGAs (Field Programmable Gate Arrays).

The control unit 12 and the I/O units 14, 16, 18, 20 store a respective frequency hopping table 58 in a suitable memory. In one exemplary embodiment, the memory may be a chip card which is inserted into an appropriate chip card holder on the housing of the control unit or I/O unit. Said chip card may contain further configuration data, such as the individual address of the unit and/or a system address in particular.

Figure 2:
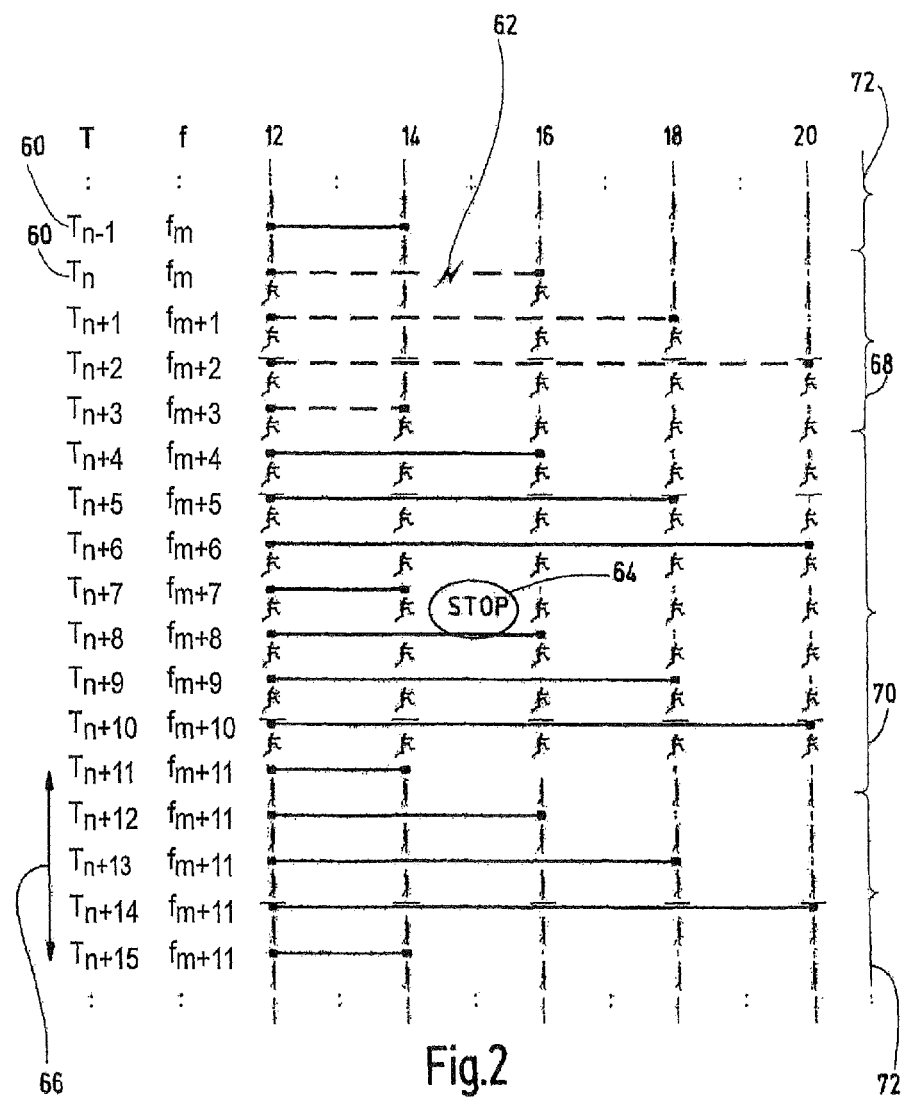
FIG. 2 shows a schematic illustration to explain the novel method.

FIG. 2 shows the basic flow of a preferred exemplary embodiment of the novel method using a time and space representation. The reference numbers 12, 14, 16, 18, 20 head five columns which are representative of the control unit 12 and of the I/O units 14, 16, 18, 20. To the left of these, there are two further columns, which are headed T and f. The T column denotes the message clock cycles $T_n$, i.e. the (second) time intervals which start when a request message 48 is sent by the control unit 12 and in which the control unit 12 expects a response message 50. The message traffic is symbolized by lines between the control unit 12 and the respectively addressed I/O unit 14, 16, 18, 20. A solid line symbolizes successful message traffic between the control unit 12 and the addressed I/O unit. A dashed line symbolizes message traffic in which at least one of the two messages (request message, response message) fails.

In the column headed f, the transmission frequency $f_n$ used for the message traffic is indicated.

Furthermore, a "hopping man" symbolizes a frequency hop from one transmission frequency to the next, the sequence of the frequency hops being effected on the basis of the standard pattern which is stored in all the units in the form of a frequency hopping table 58. A "standing man" symbolizes that the previously selected transmission frequency is being maintained.

The top row of FIG. 2 shows the start of a communication cycle in which the control unit 12 sends a request message 48 to the I/O unit 14. The I/O unit 14 responds within the (second) time interval 60 ($T_{n-1}$) with a response message 50, which is received successively by the control unit 12. In the next time interval 60 ($T_a$), the control unit 12 sends a request message 48 to the I/O unit 16. The I/O unit 16 cannot receive the request message 48 successfully in the example shown on account of interference 62. Since the expected request message 48 fails, the I/O unit 16 starts to change the transmission frequency on the basis of the pattern in the frequency hopping table 58. Furthermore, the I/O unit 16 does not send a response message 50 to the control unit 12 on account of the request message 48 being absent (from its point of view). Therefore, the control unit 12 receives no response message 50 within the time interval $T_n$, and the control unit 12 likewise starts the frequency changes on the basis of the pattern defined as standard for all the communication subscribers.

In the next message clock cycle $T_{n+1}$, the control unit 12 would actually send a request message 48 to the I/O unit 18. However, on account of the unsuccessful communication with the I/O unit 16 in the preceding message clock cycle $T_n$, the control unit 12 refrains from sending a request message 48. This signals to the I/O unit 18 that the frequency hopping process needs to be initiated. In the same way, the control unit 12 suppresses the request message 48 in order to signal to the further I/O units 20 and 14 that the frequency hopping process needs to be initiated. The interference 82 is thus the start of an interference cycle 68, as a result of which the control unit 12 suppresses the request messages 48 to all the I/O units 14, 18, 20 which would have been addressed following the (failed) communication with the I/O unit 16.

The interference cycle 68 is followed by a collection cycle 70. During the collection cycle, all the units 12 to 20 hop from one transmission frequency 52 to the next in the same order and at the same times in line with the standard pattern in all the stored frequency hopping tables 58. For this purpose, each station has an internal clock generator which determines the times for the frequency changes. The internal clock generators in all the stations are largely synchronous and they are synchronized to one another on a regular basis by means of messages during trouble-free data traffic. Preferably, each I/O unit 14 to 20 synchronizes its internal clock generator to the internal clock generator of the control unit 12 with each received request message. On the basis of this regular synchronization, the units 12 to 20 hop practically simultaneously during the interference cycle 68 and during the collection cycle 70.

Regardless of the frequency hops, the control unit 12 now starts to send again request messages 48 to the I/O units 14 to 20. At the start of the collection cycle 70, the control unit 12 uses a frequency $f_{m+4}$ for the request messages 48 which differs from the transmission frequency $f_m$ at which the interference 62 occurred by n=4 frequency hops, the number n being equal to the number of I/O units 14 to 20 involved. As shown in FIG. 2, in this case the control unit 12 sends the next request message again to the I/O unit 16 at which the interference in the communication occurred previously. If the data communication on the new frequency $f_{m+4}$ is successful, i.e. if both the request message 48 and the response message 50 have been able be received successfully, the control unit 12 sends the next request message 48 to the next I/O unit 18 in the next message clock cycle $T_{n+5}$. In this case, all units continue to hop from one transmission frequency to the next in the defined pattern.

After the message clock cycle $T_{n+7}$, the control unit 12 has successfully received a response message 50 from all the I/O units 14 to 20. In the message clock cycle $T_{n+8}$, the control unit 12 sends a request message to the I/O unit 16 which contains a frequency hopping stop command 64. The control unit 12 notifies the I/O unit 16 that the frequency hopping method needs to be ended. In the same way, the control unit 12 notifies the further I/O units 18, 20, 14 in the next message clock cycles that the frequency hopping method needs to be ended. Each addressed I/O unit acknowledges the frequency hopping stop command 64 with an appropriate response message 50. If the control unit 12 has received a response message 50 from all the I/O units 40 to 20 involved, the collection cycle ends and a "normal" communication cycle 72 begins again using the last selected transmission frequency, which from now on is maintained so long as there is no further interference with the communication.

As shown in FIG. 2, the units continue to hop for a plurality of message clock cycles after the frequency hopping stop command 64 has been received in order to ensure that all the I/O units 14 to 20 have reached the end of the collection cycle at the same transmission frequency. The number of further frequency hops after the stop command is first sent corresponds to the number of I/O units minus 1.

Reference numeral 66 denotes a (first) time interval within which each I/O unit 14-20 expects to receive a request message 48. The time interval 66 is obtained from the number of I/O units multiplied by the time interval 60 for a message clock cycle.

Overall, the novel method thus uses a message clock which is synchronous for all the units and which the units 12-20 use to determine the message clock cycles $T_n$. If an expected message is absent within the first or second time intervals, which are obtained from the message clock cycles, each unit starts the frequency hopping method. The units change their transmission and reception frequency from one message clock cycle to the next on the basis of the defined pattern, which is the same for all the units and which is stored in each unit in the form of a frequency hopping table. If all the units perform the frequency hopping process, a collection cycle takes place in which the control unit 12 first resumes the data communication with the I/O units individually and then sends a frequency hopping stop command to each unit. Thus, when all the stations have hopped from one transmission frequency to the next in sync, the frequency hopping process is ended in a coordinated manner. At the end, all units use the new transmission frequency until further interference 62 occurs and the frequency hopping process is initiated again.

In preferred exemplary embodiments, not every single instance of interference 62 results in initiation of the frequency change, however. Rather, each unit has an error memory 74 which is used to store the number of expected messages which have failed. If the fault memory exceeds a defined number of faults, for example three successive faults, the relevant station suppresses the sending of its data messages. This signals to the control unit and to the other I/O units that the frequency hopping method needs to be initiated. In some embodiments, provision the fault memory may be reset whenever a message has been successfully received.

On account of the fault memory in each unit, it is possible for the control unit 12 to send the request messages 48 strictly on the basis of the sequence of I/O units. If the data communication in a message clock cycle is disturbed, the control unit 12 does not send the request message to the I/O unit impaired by the interference until in the next complete communication cycle. In other exemplary embodiments, the control unit 12 may send the request message to the same I/O unit directly after data communication has failed.

In preferred exemplary embodiments, the frequency hopping table 58 is created by taking into account existing frequency uses. By way of example, frequency ranges within the 2.4 GHz frequency band are omitted which are provided for powerful RFID transmissions. Furthermore, it may be advantageous to block particular transmission frequencies on a basis of country or location.

What is claimed is:

1. A method for transmitting data between a control unit and a plurality of remote I/O units in an automated installation, the method comprising steps of:
   transmitting a plurality of request messages from the control unit to the I/O units, and
   transmitting a plurality of response messages from the I/O units to the control unit,
   wherein the request messages and the response messages are transmitted using radio-frequency signals,
   wherein the I/O units expect to receive a request message within defined first time intervals, and the control unit expects to receive at least one response message within defined second time intervals,
   wherein the control unit and the I/O units maintain a selected transmission frequency for as long as the request messages and response messages are received within respective defined time intervals, and
   wherein the control unit and the I/O units change the transmission frequencies on the basis of a defined pattern if no expected message is received within respective defined time intervals.

2. The method of claim 1, wherein the control unit changes the transmission frequency in accordance with the defined pattern only if the control unit does not receive an expected response message within the defined second time interval.

3. The method of claim 1, wherein the I/O units change the transmission frequency in accordance with the defined pattern only if an expected request message is not received within the first time interval.

4. The method of claim 1, wherein the control unit and the I/O units, respectively, change the transmission frequencies in accordance with the defined pattern only if no expected message is received within a plurality of defined first and second time intervals, respectively.

5. The method of claim 1, wherein the control unit sends the request messages to the I/O units in a predefined sequence, and wherein the control unit stops sending the request messages for a defined period of time if an expected response message is absent.

6. The method of claim 5, wherein the defined period of time is at least equal to the length of the second time interval multiplied by the number of I/O units in the defined sequence minus 1.

7. The method of claim 1, wherein the control unit sends a frequency change stop command to the I/O units if it has received a response message from all addressed I/O units within the defined second time intervals.

8. The method of claim 1, wherein the control unit checks whether or not a transmission frequency is free from interference prior to sending a request message.

9. The method of claim 1, wherein transmission frequencies at which response messages repeatedly fail are removed from the defined pattern.

10. The method of claim 1, wherein the pattern defines a sequence of different transmission frequencies from a group of available transmission frequencies, and wherein the transmission frequencies are arranged in the sequence with maximum relative frequency differences.

11. An automatically operating installation, comprising a control unit and a plurality of remote I/O units, wherein the control unit wirelessly communicates with the I/O units using transmission frequencies in order to read in state data for the installation from the I/O units and in order to output control commands to the I/O units, wherein the control unit is designed to transmit a plurality of request messages to the I/O units and to receive a plurality of response messages from the I/O units, wherein the I/O units are designed to receive the request messages and, on the basis thereof, to transmit the response messages, wherein the I/O units expect to receive a request message within defined first time intervals, and the control unit expects to receive at least one response message within defined second time intervals, wherein the control unit and the I/O units each maintain a selected transmission frequency for as long as the request messages and the response messages are received within respective defined time intervals, and wherein the control unit and the I/O units each change the transmission frequency in accordance with a defined pattern if no expected message is received within respective defined time intervals.

12. A control unit for controlling an automatically operating installation comprising a plurality of remote I/O units, the control unit comprising a transceiver for transmitting request messages to the I/O units and for receiving response messages from the I/O units using a transmission frequency, wherein the transceiver is designed to expect a response message within a predefined time interval, and further comprising a memory for storing a defined frequency hopping table, wherein the transceiver is further designed to change a transmission frequency in accordance with the defined frequency hopping table if and only if no response message is received within the predefined time interval.

13. An I/O unit for an automatically operating installation comprising a control unit and a plurality of I/O units, the I/O unit comprising a transceiver for receiving request messages from the control unit and for transmitting response messages to the control unit using a transmission frequency, wherein the transceiver is designed to expect a request message within a predefined time interval, and further comprising a memory for storing a defined frequency hopping table, wherein the transceiver is further designed to change a transmission frequency in accordance with the defined frequency hopping table if and only if no request message is received within the predefined time interval.

* * * * *